United States Patent
Wakeman

(10) Patent No.: US 6,708,712 B2
(45) Date of Patent: Mar. 23, 2004

(54) PRESSURE REGULATOR UTILIZING A DISC SPRING

(75) Inventor: Robert W. Wakeman, Watertown, SD (US)

(73) Assignee: Illinois Tool Works Inc., Glenview, IL (US)

( * ) Notice: Subject to any disclaimer, the term of this patent is extended or adjusted under 35 U.S.C. 154(b) by 48 days.

(21) Appl. No.: 09/971,270

(22) Filed: Oct. 4, 2001

(65) Prior Publication Data
US 2003/0066562 A1 Apr. 10, 2003

(51) Int. Cl.$^7$ .................. F16K 17/06; G05D 16/10
(52) U.S. Cl. ............... 137/15.19; 137/505; 137/505.42; 251/337
(58) Field of Search .............. 137/505, 505.42, 137/15.19; 251/337

(56) References Cited

U.S. PATENT DOCUMENTS

| 1,264,006 | A | * | 4/1918 | Bucknam | 137/505.42 |
|---|---|---|---|---|---|
| 3,700,006 | A | | 10/1972 | Marcillaud | 137/625.21 |
| 3,876,182 | A | | 4/1975 | Hansson | 254/168 |
| 3,926,208 | A | * | 12/1975 | Hoffman | 137/505.42 |
| 3,957,248 | A | | 5/1976 | Hannson | 254/168 |
| 4,014,414 | A | | 3/1977 | Yamamoto et al. | 188/170 |
| 4,151,979 | A | * | 5/1979 | Visalli | 251/337 |
| 4,253,496 | A | | 3/1981 | Wolf et al. | 137/862 |
| 4,361,217 | A | | 11/1982 | Bieber et al. | 192/103 FA |
| 4,445,424 | A | | 5/1984 | Foster et al. | 92/5 R |
| 4,523,516 | A | | 6/1985 | Foster et al. | 92/130 B |
| 4,662,603 | A | | 5/1987 | Etheridge | 251/63.5 |
| 4,693,267 | A | * | 9/1987 | Patterson | 137/116.5 |
| 4,730,977 | A | | 3/1988 | Haaser | 415/104 |
| 4,774,980 | A | | 10/1988 | Etheridge | 137/488 |
| 5,697,554 | A | | 12/1997 | Auwaerter et al. | 239/88 |
| 5,727,509 | A | | 3/1998 | Speil | 123/90.55 |
| 5,890,463 | A | | 4/1999 | Speil | 123/90.46 |
| 5,899,221 | A | * | 5/1999 | Holt et al. | 137/505.25 |
| 6,047,727 | A | * | 4/2000 | Hatori et al. | 137/505.28 |

* cited by examiner

Primary Examiner—Stephen M. Hepperle
(74) Attorney, Agent, or Firm—Fletcher Yoder

(57) ABSTRACT

A pressure regulator having a disc spring. The pressure regulator comprises a valve having a movable device that is positioned to control fluid flow through the pressure regulator. Downstream fluid pressure produces a first force acting on the movable device to close the valve to block fluid flow through the pressure regulator. The disc spring produces a second force that acts on the movable device to open the valve to enable fluid to flow through the pressure regulator.

29 Claims, 6 Drawing Sheets

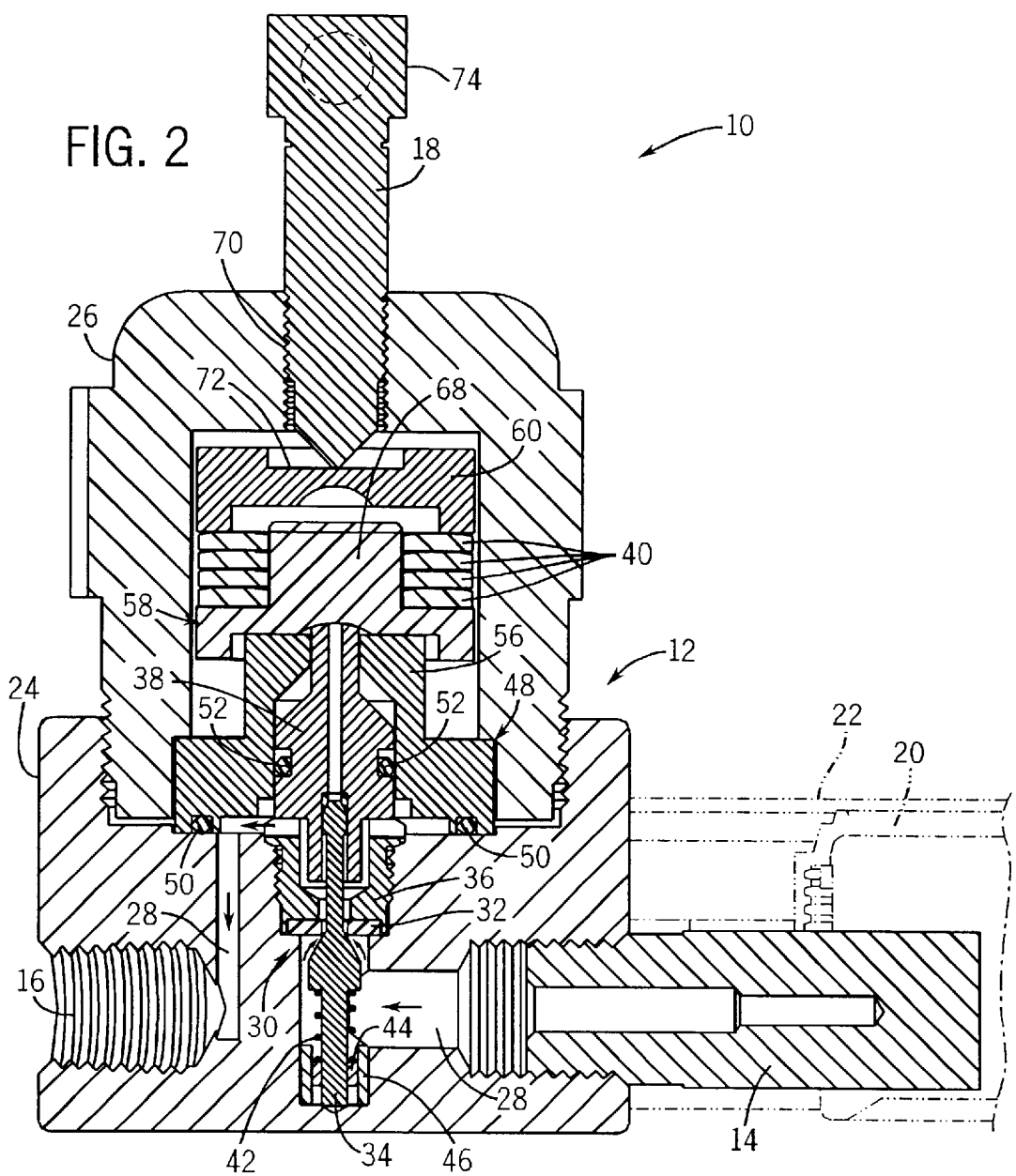
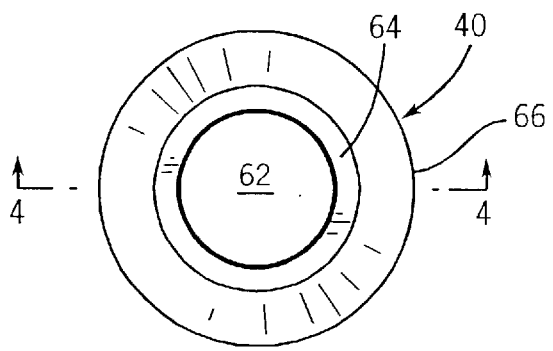
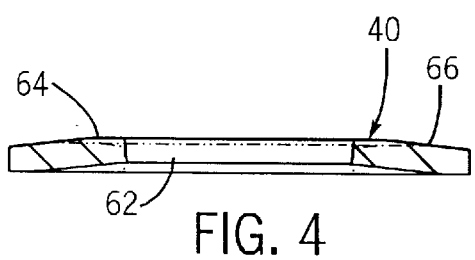

PRESSURE REGULATOR UTILIZING A DISC SPRING

FIELD OF THE INVENTION

The present invention relates generally to pressure regulators, and particularly to a pressure regulator having a disc spring for controlling fluid pressure.

BACKGROUND OF THE INVENTION

Pressure regulators are typically used in fluid systems to regulate a flow of fluid through the pressure regulator to maintain downstream fluid pressure at a desired level. Typically, a pressure regulator is used to reduce the pressure of a fluid from a higher pressure down to a lower pressure. For example, some welding systems use pressurized gas either for fuel or to form a gas shield around a weld surface. The gas is stored at a high pressure so that the pressure of the gas within a cylinder is sufficient to cause the gas to flow throughout the system and so that as much gas as possible can be stored within the limited volume of the cylinder. However, welding systems do not operate well at the high pressures associated with the pressurized gas within the cylinder. Therefore, a pressure regulator is typically used to reduce the pressure of the gas down to a lower, more conducive, gas pressure.

Typically, a pressure regulator has an inlet, an outlet and a valve to control the flow of fluid from the inlet to the outlet. The regulator senses the pressure downstream and opens the valve to allow additional fluid to flow through the regulator to raise the pressure downstream. The pressure regulator closes the valve once the desired downstream pressure has been achieved. A typical valve for a pressure regulator has a valve stem and a seat surrounding an orifice. When downstream pressure is lower than desired, the valve directs the stem away from the seat to allow fluid to flow through the orifice to raise the pressure of the fluid downstream. When the desired downstream pressure is achieved, the valve urges the stem against the seat to prevent more fluid from flowing through the orifice.

In a typical pressure regulator, several forces act on the stem. A biasing spring is typically used to maintain the stem against the seat when no other forces are acting on the stem, or when the sum of the other forces acting on the stem is zero. A helical regulating spring is typically used to establish the desired downstream pressure. For low pressure applications, a diaphragm is typically used to couple the force of the regulating spring to the stem. A diaphragm is flexible and couples the pressure of the fluid downstream of the regulator to the regulating spring. For higher pressure applications, a movable piston is typically used to couple the force of the regulating spring to the stem. When the force produced by the pressure of the fluid acting on the diaphragm or piston is greater than the force applied by the regulating spring, the diaphragm or piston is positioned so that the stem is seated against the seat. When the force produced by the pressure of the fluid acting on the diaphragm is less than the force applied by the regulating spring, the diaphragm is positioned so that the stem is unseated from the seat, allowing fluid to flow downstream to raise the downstream fluid pressure. Eventually, the rise in pressure downstream will be sufficient to overcome the force of the regulating spring and close the regulator, thereby establishing the downstream pressure. By varying the force applied to the diaphragm or piston by the regulating spring, the downstream pressure can be adjusted. A threaded mechanism is typically used to vary the force applied by the spring by compressing or uncompressing the regulating spring.

Typically, the regulator is configured with a body and a bonnet to house the regulator components. The helical adjusting spring establishes the size of the bonnet because the bonnet must be large enough to receive the helical adjusting spring. Consequently, the bonnet may be very large compared to the body. Furthermore, the body and other internal components must be configured to cooperate with the helical adjusting spring. The larger the adjusting spring, the larger the other components must be to properly cooperate with the adjusting spring.

Further difficulties arise when the pressure regulator is used to regulate very high pressures. For example, a high pressure regulator may be used to reduce an upstream pressure of 10,000 pounds per square inch to a downstream pressure of 6,000 pounds per square inch. The force that must be generated by the adjusting spring to regulate these pressures is very large. This may require a very large helical spring to generate the necessary force to control the pressure.

There exists a need for a pressure regulator valve assembly that solves some or all of the problems outlined above. Specifically, there is a need for a pressure regulator that uses a force provided by a device other than a helical spring to regulate fluid pressure.

SUMMARY OF THE INVENTION

The present technique provides a novel regulator designed to respond to such needs. According to one aspect of the present technique, a pressure regulator comprising a movable stem and at least one disc spring is featured. The movable stem is operable to control fluid flow through the pressure regulator to regulate fluid pressure downstream of the pressure regulator. In a first position of the stem, the stem blocks fluid flow through the pressure regulator. In a second position of the stem, the stem enables fluid to flow through the pressure regulator. Downstream fluid pressure produces a first force to urge the stem towards the first position. The at least one disc spring produces a second force to urge the stem towards the second position.

According to another aspect of the present technique, a pressure regulator to control downstream fluid pressure is featured. The pressure regulator comprises a movable stem, a movable piston, and a disc spring. The movable stem operable to control fluid flow through the pressure regulator. The movable piston is coupled to the stem to direct movement of the stem. Downstream fluid pressure produces a first force acting on the piston and the disc spring produces a second force that acts on the piston.

According to yet another aspect of the technique, a fluid supply system is featured. The fluid supply system comprises a source of pressurized fuel and a pressure regulator. The pressure regulator is fluidically coupled to the source of pressurized. The pressure regulator comprises a plurality of disc springs and a disc spring compression assembly. The disc spring compression assembly is operable to variably compress the plurality of disc springs. When the plurality of disc springs are compressed they produce a spring force to urge the pressure regulator to open to allow fluid to flow through the pressure regulator from the source of pressurized fluid to raise downstream fluid pressure.

According to yet another aspect of the technique, a method of assembling a pressure regulator is featured. The method comprises placing at least one disc spring within a cavity formed between a first and a second pressure regulator housing, wherein the at least one disc spring provides a spring force to urge the pressure regulator to enable fluid flow through the pressure regulator. The method further comprises securing the first pressure regulator housing to the second pressure regulator housing.

BRIEF DESCRIPTION OF THE DRAWINGS

The invention will hereafter be described with reference to the accompanying drawings, wherein like reference numerals denote like elements, and:

FIG. 2 is a cross-sectional view of the pressure regulator of FIG. 1, taken generally along line 2—2 of FIG. 1;

FIG. 3 is a top view of a disc spring, according to an exemplary embodiment of the present invention;

FIG. 4 is a cross-sectional view of the disc spring of FIG. 4, taken generally along line 4—4 of FIG. 3;

DETAILED DESCRIPTION OF THE PREFERRED EMBODIMENTS

Figure 1:
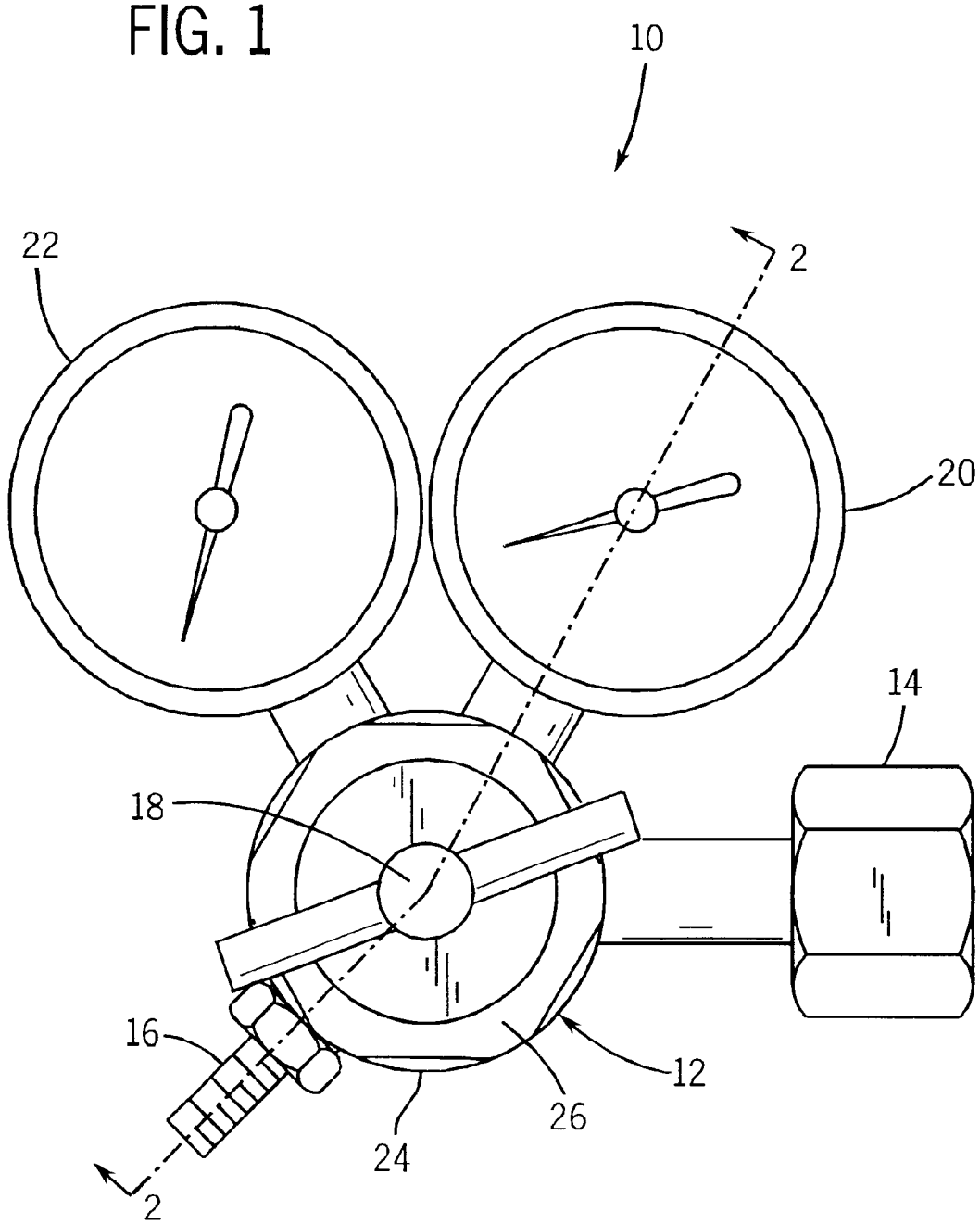
FIG. 1 is a perspective view of a pressure regulator, according to an exemplary embodiment of the present technique.

Referring generally to FIG. 1, an exemplary pressure regulator 10 is illustrated. The pressure regulator 10 has a central housing 12 that houses the internal components of the pressure regulator 10. The central housing 12 has a fluid inlet 14 and a fluid outlet 16. Fluid enters the regulator 10 through the inlet 14 and exits through the outlet 16. An adjusting screw 18 is used to operate the pressure regulating portions of the pressure regulator 10 to establish the downstream pressure. An upstream pressure gauge 20 is used to indicate the pressure of the fluid entering the pressure regulator 10. A downstream pressure gauge 22 is used to indicate the pressure of fluid downstream of the pressure regulator 10. The pressure regulator 10 also may have a relief valve (not shown). The relief valve is set to relieve pressure if the pressure within the pressure regulator exceeds a pre-set amount. This protects the regulator from damage due to over-pressurization.

Referring generally to FIGS. 2 and 3, the illustrated central housing 12 has a body 24 and a bonnet 26. The bonnet 26 is threaded onto the body 24 to form a protective shell for the internal components of the pressure regulator 10. The body 24 is formed to create an internal fluid flow path 28 through the pressure regulator 10. The body 24 also has threaded openings to enable the pressure gauges to be secured to the pressure regulator and to be in fluid communication with the upstream and downstream fluid pressures. A valve assembly 30 is disposed in the internal fluid flow path 28 to control fluid flow from the inlet 14 to the outlet 16.

The valve assembly 30 has a seat 32 and a stem 34. The seat 32 is maintained in position by a hollow seat retainer 36 (see, e.g., FIGS. 6 and 7). In the open position of the valve assembly 30, the stem 34 is positioned relative to the seat 32 such that fluid is able to flow through the seat 32 and the seat retainer 36. In the closed position of the valve assembly 30, the stem 34 is positioned against the seat 32 to block fluid flow through the seat 32 and seat retainer 36. In the illustrated embodiment, the stem 34 is coupled to a movable piston 38. As discussed more fully below, the movable piston 38 is positioned in response to downstream fluid pressure and a spring force provided by one or more disc springs 40. In the illustrated embodiment, four disc springs are used to provide the spring force. Additionally, a biasing spring 42 is used to bias the stem 34 to the seated position against the seat retainer 36. An inner friction sleeve 44 and an outer friction sleeve 46 are used to dampen movement of the stem 34.

The piston 38 is housed within a piston housing 48. The piston housing 48 is stationary and the piston 38 is free to move within the piston housing 48. A sealing member 50, such as an O-ring, is used to form a seal between the piston housing 48 and the body 24. Another sealing member 52, such as an O-ring, is used to form a seal between the piston 38 and the interior of the piston housing 48. The piston housing 48 has a hole 54 that is used to guide a cylindrical portion 56 of the piston 38 during movement of the piston 38.

Figure 5:
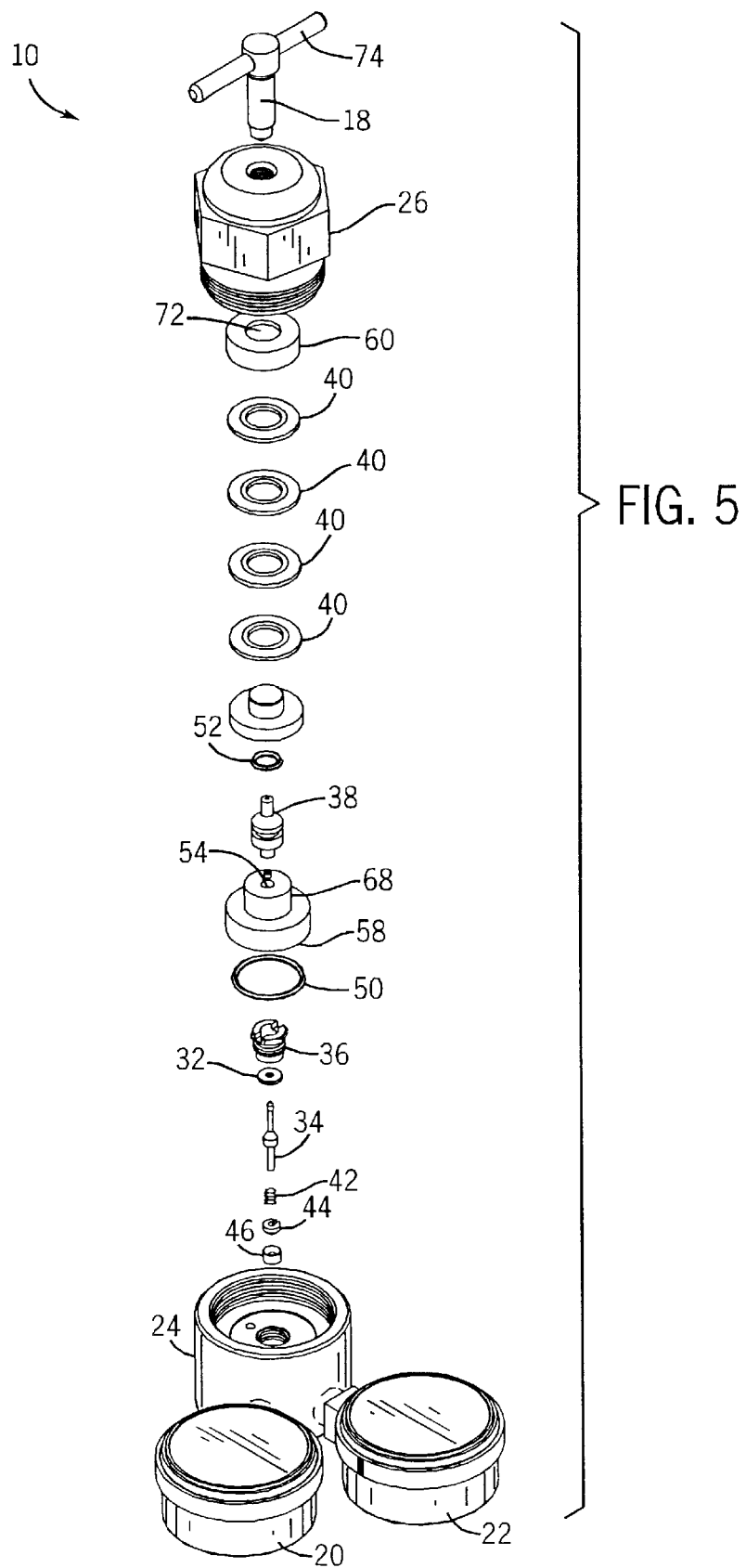
FIG. 5 is an exploded view of the components of the central housing of FIG. 1.

A lower spring button 58 and an upper spring button 60 are used to direct the movement of the disc springs 40 during compression and expansion. As best illustrated in FIGS. 4 and 5, each disc spring 40 has a central opening 62 therethrough. In the illustrated embodiment, each disc spring has a relatively flat portion 64 radially surrounding the central opening 62. Surrounding the flat portion 64 is an angled portion 66. Each disc spring 40 is compressed by flattening the angled portion 66. The disc springs 40 are elastically deformed during compression, generating a spring force to oppose the force of compression. The disc spring 40 returns to its original shape after the force of compression is removed. Referring again to FIGS. 2 and 3, in the illustrated embodiment, the lower spring button 58 has a cylindrical portion 68. The disc springs 40 and lower spring button 58 are assembled so that the cylindrical portion is disposed through the central opening 62 of at least one disc spring 40 to guide the movement of the disc spring 40.

The second spring button 60 is used with the adjusting screw to produce a spring force that is coupled to the piston 38. In the illustrated embodiment, the adjusting screw 18 is threaded through a threaded opening 70 in the bonnet 26. The second spring button 60 has a receiving portion 72 that is adapted to receive the adjusting screw 18. As the adjusting screw 18 is threaded into engagement with the upper spring button 60, the upper spring button 60 is driven against the disc springs 40. This force is translated through the disc springs 40 the lower spring button 58 and the piston 38. The pressure of fluid downstream of the valve assembly 30 also produces a force that urges the piston 38 against the lower disc spring 58. Thus, the disc springs 40 are compressed between the lower and upper spring buttons.

In the illustrated embodiment, the adjusting screw 18 is positioned by rotating a handle 74 coupled to the adjusting screw 18. To raise the downstream pressure to a higher desired pressure, the adjusting screw 18 is threaded into the bonnet 26, which forces the disc springs 40 against the lower spring button 58 and piston 38. This action compresses the disc springs 40 and increases the force that must be provided by the fluid pressure downstream to overcome the force of the disc springs 40 to close the seat 32 against the seat retainer 36. To lower the downstream pressure, the adjusting screw 18 is threaded out of the bonnet 26, which reduces the force of the disc springs 40 against the lower spring button 58 and piston 38.

When downstream pressure is lower than the desired pressure set by the disc springs 40, the piston 38 will driven downward, in the view of FIG. 2. The downward movement of the piston 38 is coupled to the seat 32 by the stem 34. The downward movement of the stem 34 compresses the disc springs 40 and positions the stem 34 to allow fluid to flow downstream, thereby raising the pressure downstream. Eventually, the downstream pressure should rise to the new desired pressure and the piston 38 will overcome the force of the disc springs 40 and be driven upward, in the view of FIG. 2. The upward movement urges the stem 34 against the seat 32, stopping additional fluid flow through the pressure regulator 10. A similar process takes place if the adjusting screw 18 is rotated outward from the bonnet 26. The force applied by the disc springs 40 is thereby lowered. As the pressure downstream drops, the stem 34 will open to raise the pressure. However, the downstream pressure needed to overcome the spring 40 and position the stem 34 in the closed position is lessened, thereby maintaining downstream pressure at a lower pressure.

Figure 6:
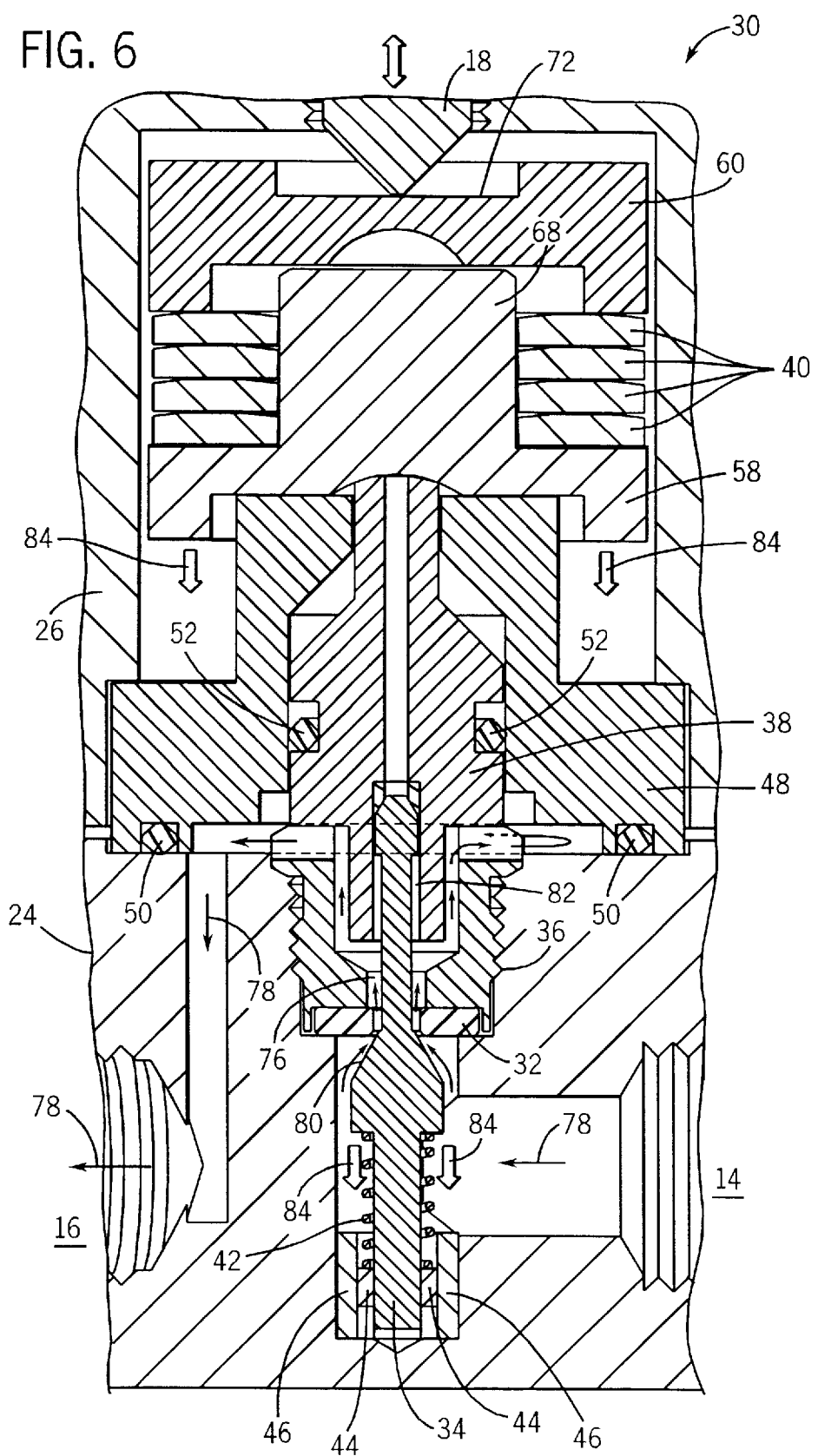
FIG. 6 is a cross-sectional view of a valve assembly illustrating a stem positioned in an unseated position, according to an exemplary embodiment of the present technique.
Figure 7:
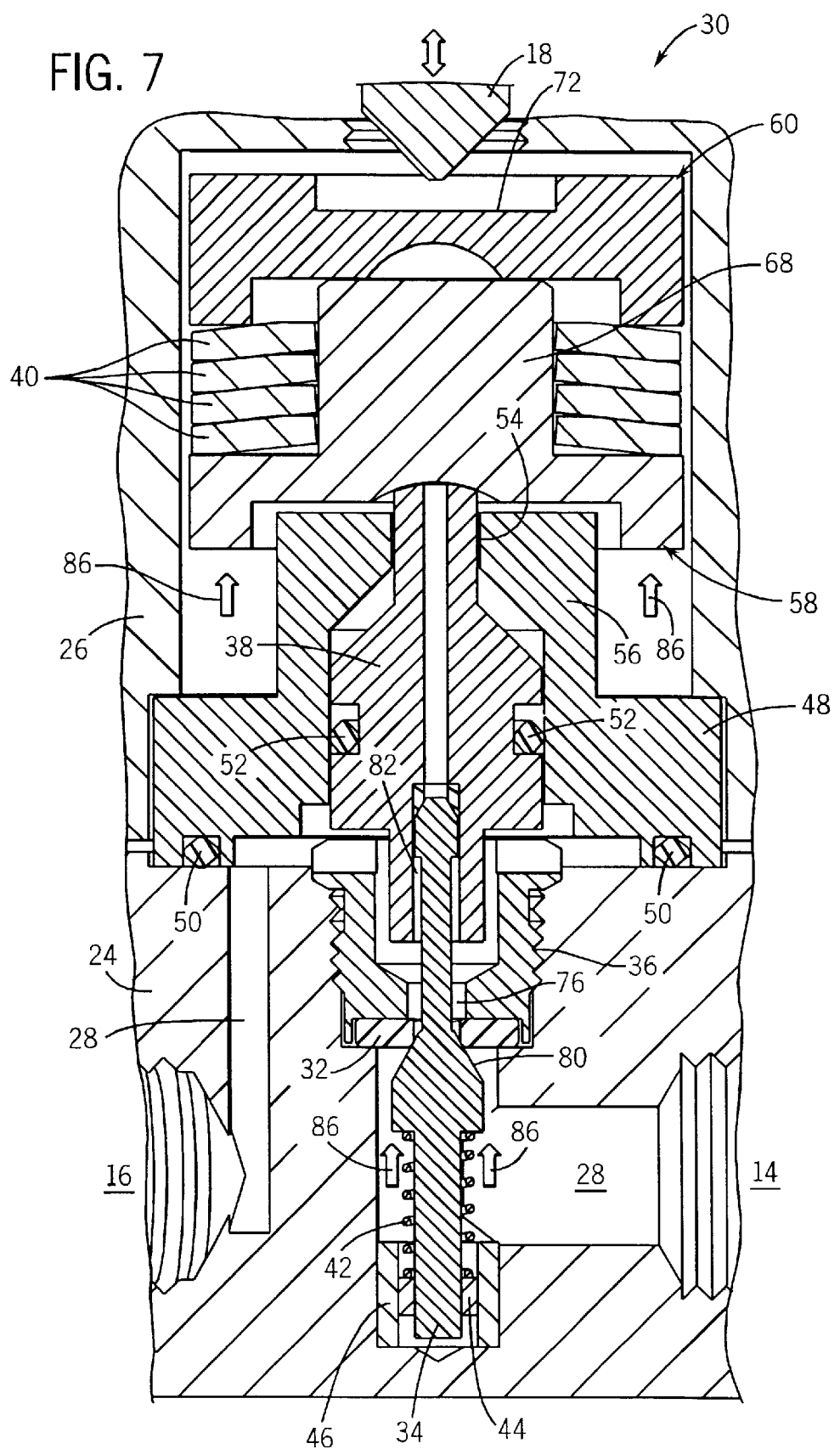
FIG. 7 is a cross-sectional view of a valve assembly illustrating the stem positioned in a seated position, according to an exemplary embodiment of the present technique.

Referring generally to FIGS. 6 and 7, the seat retainer 36 has an orifice 76 to enable fluid to flow through the seat retainer 36 and fluid path 28 from the inlet 14 to the outlet 16. When the valve assembly 30 is in the open position, as illustrated in FIG. 6, the stem 34 is positioned downward, in this view, such that fluid 78 is able to flow through the internal passageways 28 and orifice 76 from the inlet 14 to the outlet 16 of the pressure regulator 10. When the valve assembly is in the closed position, as illustrated in FIG. 7, the stem 34 is positioned upward, in this view, such that a conical portion 80 of the stem 34 is positioned against the seat 32, blocking fluid flow through the orifice 76.

The stem 34 follows the movement of the piston 38. The stem 34 extends through the orifice 76 into a recess 82 in the piston 38. The stem 34 and recess 82 are configured so that the stem 34 is secured to the piston 38 when the stem 34 is driven into the recess 82. When the force of the disc springs 40 is greater than the force produced by the pressure of the downstream fluid, the lower spring button 58 drives the piston 38, and stem 34, downward, as represented by arrows 84 in FIG. 6, enabling fluid flow through the pressure regulator 10. When the force of the pressure of the downstream fluid is greater than the force produced by the disc springs 40, the piston 38 drives the lower spring button 58, and stem 34, upward, as represented by arrows 86 in FIG. 7, preventing fluid flow through the pressure regulator 10.

Figure 8:
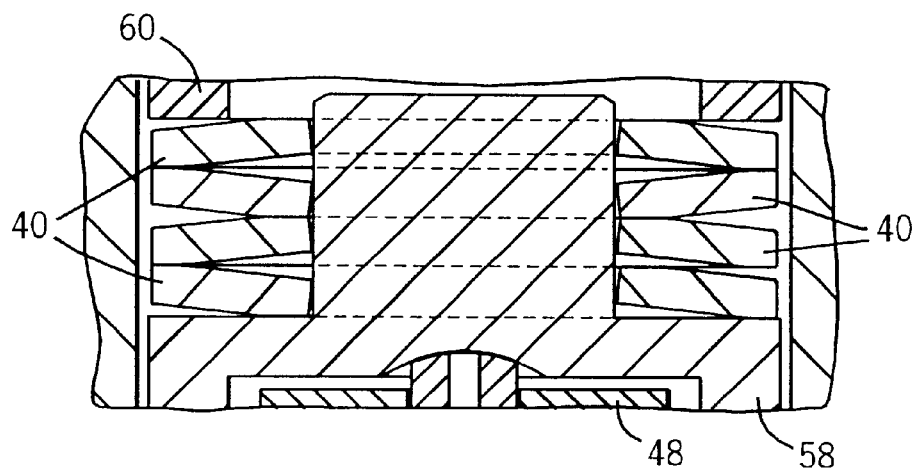
FIG. 8 is an alternative arrangement of disc springs in a pressure regulator, according to an exemplary embodiment of the present technique.

Referring generally to FIG. 8, the disc springs 40 also may be positioned back-to-back or, in other words, face-to-face. This arrangement provides a more precise control of the disc spring force than does the end-to-end arrangement illustrated in FIGS. 1–7.

Figure 9:
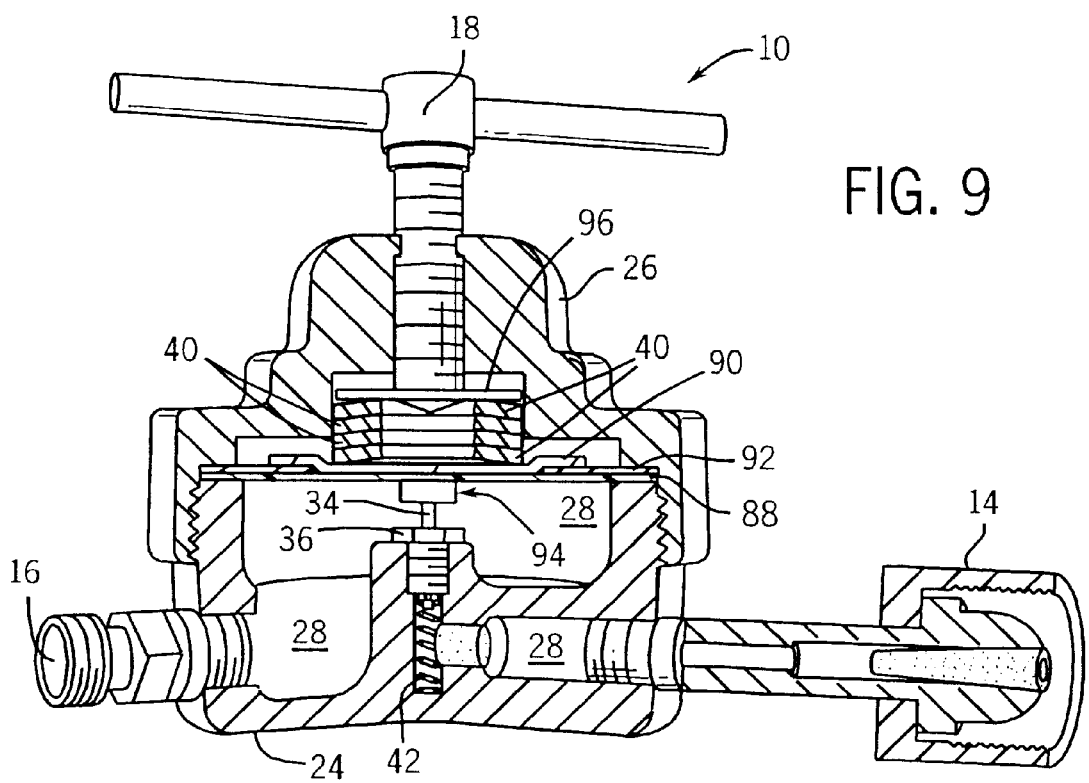
FIG. 9 is an alternative embodiment of a pressure regulator that utilizes a diaphragm, according to an exemplary embodiment of the present invention.

Referring generally to FIG. 9, as an alternative to using a piston and piston housing, a flexible diaphragm 88 may be used. The diaphragm 88 forms a seal across the interior of the central housing 12. The force provided by the downstream pressure tries to flex the diaphragm 88 upward, in this view, while the force of the disc springs 40 tries to flex the diaphragm 88 downward, in this view. The disc springs 40 are coupled to the diaphragm 88 by a backup plate 90. A diaphragm washer 92 is used to protect the diaphragm 88 from damage when installing the bonnet 26 to the body 24. A stem support 94 is used to enable the stem 34 to follow the movement of the diaphragm 88. A spring button 96 is used to enable the adjusting screw 18 to control the force provided by the disc springs 40 onto the diaphragm 88.

When the force of the disc springs 40 is greater than the force produced by the pressure of the downstream fluid, the diaphragm 88 is flexed downward. The diaphragm 88 drives the stem support piston 38 and stem 34 downward, in this view, enabling fluid flow through the pressure regulator 10. When the force of the pressure of the downstream fluid on the diaphragm is greater than the force produced by the disc springs 40, the diaphragm 88 is flexed upward. The biasing spring 42 drives the stem 34 and stem support 94 upward, blocking the orifice (not shown) and preventing fluid flow through the pressure regulator 10.

It will be understood that the foregoing description is of preferred exemplary embodiments of this invention, and that the invention is not limited to the specific forms shown. For example, the regulator may be a dual-regulator system. Additionally, the regulator may be used with gas welding systems, compressed air systems, or any other suitable system utilizing a pressure regulator. Furthermore, the regulator may be configured to control pressure over a variety of pressure ranges. These and other modifications may be made in the design and arrangement of the elements without departing from the scope of the invention as expressed in the appended claims.

What is claimed is:

1. A pressure regulator, comprising:
   a movable member operable to control fluid flow through the pressure regulator to regulate fluid pressure downstream of the pressure regulator, wherein fluid flow through the pressure regulator is blocked by the member in a first position of the member and fluid flow through the pressure regulator is enabled in a second position of the member;
   at least one disc spring, wherein downstream fluid pressure produces a first force to urge the member towards the first position and the at least one disc spring produces a second force to urge the member towards the second position;
   a housing for the at least one disc spring;
   an adjustment assembly comprising a threaded member adapted to be threaded into the housing to compress the at least one disc spring to increase the second force produced by the at least one disc spring and increase downstream pressure; and
   a spring button disposed between the at least one disc spring and the threaded member, the spring button comprising a shaft extending completely through the at least one disc spring.

2. The pressure regulator as recited in claim 1, wherein the spring button is configured to receive the threaded member.

3. The pressure regulator as recited in claim 1, wherein the at least one disc spring comprises a plurality of disc springs positioned end-to-end.

4. The pressure regulator as recited in claim 1, comprising a first disc spring and a second disc spring, wherein the first and second disc springs are positioned in facing relation to each other.

5. The pressure regulator as recited in claim 1, further comprising a spring button having an extension, wherein the extension is adapted to be disposed through an opening through the at least one disc spring.

6. The pressure regulator as recited in claim 1, further comprising a piston disposed within a piston housing, the piston being coupled to the member and the piston housing being coupled to the at least one disc spring, wherein the piston is urged by the first force in a first direction and by the second force in the second direction.

7. The pressure regulator as recited in claim 6, further comprising a spring button between the at least one disc spring and a piston housing, wherein the spring button is adapted to receive the at least one disc spring.

8. The pressure regulator as recited in claim 7, wherein the spring button and piston housing are adapted for engagement.

9. A pressure regulator operable to control downstream fluid pressure, comprising:
   a piston operable to control fluid flow through the pressure regulator, wherein the pressure regulator is adapted such that downstream fluid pressure urges the piston in a first direction; and
   a disc spring operable to produce a spring force; and
   a movable spring button adapted to extend completely through the disc spring and to transmit the spring force to the movable piston, wherein the pressure regulator is adapted such that the spring force urges the spring button in a second direction, the second direction being opposite the first direction.

10. The pressure regulator as recited in claim 9, wherein the disc spring comprises a first and a second disc spring, wherein the first disc spring is nested within the second disc spring.

11. The pressure regulator as recited in claim 9, wherein the disc spring comprises a first and a second disc spring, each disc spring having a first surface and a second surface, wherein the first and second disc springs are oriented so that the first surface of the first disc spring is oriented towards the first surface of the second disc spring.

12. The pressure regulator as recited in claim 9, further comprising an adjustment assembly operable to establish a desired downstream pressure from among a range of downstream fluid pressures.

13. The pressure regulator as recited in claim 12, wherein the adjustment assembly is operable to vary the spring force provided by the disc spring to establish the downstream fluid pressure required to overcome the spring force.

14. The pressure regulator as recited in claim 12, wherein the adjustment assembly is operable to drive the disc spring into compression.

15. The pressure regulator as recited in claim 9, further comprising an aligning assembly operable to direct movement of the disc spring within the pressure regulator.

16. A fluid supply system, comprising:
   a pressure regulator coupleable to a source of pressurized fluid, the pressure regulator comprising:
      a plurality of disc springs;
      a spring guide comprising a base and a shaft, the shaft extending completely through the plurality of disc springs; and
      a disc spring compression assembly operable to compress the plurality of disc springs by threading an operator into the pressure regulator, wherein the plurality of disc springs produce a spring force to urge the pressure regulator to open to allow fluid to flow through the pressure regulator from the source of pressurized fluid to raise downstream fluid pressure.

17. The system as recited in claim 16, further comprising a moveable piston coupled to the plurality of disc springs, wherein fluid flow through the pressure regulator is controlled by piston position, further wherein the piston is urged by downstream fluid pressure to close to prevent fluid from flowing downstream.

18. The system as recited in claim 16, further comprising a diaphragm coupled to the at least one disc spring, wherein fluid flow through the pressure regulator is controlled by diaphragm position, further wherein the diaphragm is urged by downstream fluid pressure to close to prevent fluid from flowing downstream.

19. The system as recited in claim 16, wherein each disc spring has a first side and a second side, wherein a first disc spring and a second disc spring are oriented first side to second side within the pressure regulator.

20. The system as recited in claim 16, wherein each disc spring has a first side and a second side, wherein a first disc spring and a second disc spring are oriented first side to first side within the pressure regulator.

21. A method of assembling a pressure regulator, comprising the acts of:
   disposing a portion of a first spring button completely through at least one disc spring;
   disposing the first spring button against a piston within a cavity formed between a first and a second pressure regulator housing,
   disposing a second spring button against the at least disc spring, wherein the at least one disc spring is operable to provide a spring force to urge the first spring button against the piston to enable fluid to flow through the pressure regulator; and
   securing the first pressure regulator housing to the second pressure regulator housing.

22. The method as recited in claim 21, further comprising the act of adapting the at least one disc spring with an opening therethrough.

23. The method as recited in claim 22, further comprising the act of adapting a spring button with an extension configured to receive at least one disc spring over the extension.

24. The method as recited in claim 23, wherein disposing a portion of a first spring button through at least one disc spring comprises disposing a plurality of disc springs over the extension.

25. The method as recited in claim 23, further wherein a first disc spring and a second disc spring are oriented in facing relationship to each other.

26. The method as recited in claim 21, further comprising the act of threading a threaded member through the first housing, the threaded member being operable to apply a force to the second spring member to compress the at least one disc spring.

27. The method as recited in claim 26, wherein the second spring button is configured to receive the threaded member.

28. The method as recited in claim 21, further comprising the act of disposing the first spring button between the at least one disc spring and a piston housing.

29. The method as recited in claim 28, wherein the first spring button and the piston housing are adapted for engagement.

* * * * *